US011809655B2

(12) United States Patent
Lee et al.

(10) Patent No.: US 11,809,655 B2
(45) Date of Patent: Nov. 7, 2023

(54) TOUCH CONTROL METHOD INTEGRATING FINGERPRINT RECOGNITION AND TOUCH OPERATION MODES

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 18/104,287

(22) Filed: Jan. 31, 2023

(65) Prior Publication Data

US 2023/0168763 A1 Jun. 1, 2023

Related U.S. Application Data

(62) Division of application No. 17/536,062, filed on Nov. 28, 2021, now Pat. No. 11,614,821.

(30) Foreign Application Priority Data

Jan. 20, 2021 (TW) .................................. 110102165

(51) Int. Cl.
*G06F 3/041* (2006.01)
*G06F 3/044* (2006.01)
*G06F 21/32* (2013.01)
*G06V 40/13* (2022.01)

(52) U.S. Cl.
CPC .......... *G06F 3/0416* (2013.01); *G06F 3/0412* (2013.01); *G06F 3/0446* (2019.05); *G06F 21/32* (2013.01); *G06V 40/1306* (2022.01)

(58) Field of Classification Search
CPC .... G06F 3/0412; G06F 3/0416; G06F 3/0446; G06F 21/32
See application file for complete search history.

(56) References Cited

U.S. PATENT DOCUMENTS

2017/0003805 A1* 1/2017 Chen ..................... G06F 3/0416
2020/0089933 A1* 3/2020 Lius ..................... G06F 1/1684
2020/0293746 A1* 9/2020 Hu ......................... G06F 21/32

\* cited by examiner

*Primary Examiner* — Liliana Cerullo
(74) *Attorney, Agent, or Firm* — Chun-Ming Shih; HDLS IPR SERVICES

(57) ABSTRACT

A touch control method is provided. The method includes: providing a touch device with multiple touch electrodes; determining whether an object is located in a sensing distance; detecting a sensing group sensing the object if the determination is yes; determining whether an electrode amount in the electrode group is between a first value and a second value; determining whether a sensing time of a predetermined proportion of the touch electrodes in the sensing group is equal to or greater than a predetermined time; executing a fingerprint recognition mode if the electrode amount is between the first value and the second value, and the sensing time is equal to or greater than the predetermined time; executing a touch operation mode if the electrode amount is less than the first value or greater than the second value, or the sensing time is less than the predetermined time.

10 Claims, 6 Drawing Sheets

TOUCH CONTROL METHOD INTEGRATING FINGERPRINT RECOGNITION AND TOUCH OPERATION MODES

CROSS-REFERENCE TO RELATED APPLICATION

The present application is a divisional application of U.S. Ser. No. 17/536,062 filed on Nov. 18, 2021, which claims priority to TW110102165 filed Jan. 20, 2021. The entire disclosures of the above application are all incorporated herein by reference.

BACKGROUND OF THE DISCLOSURE

Technical Field

The disclosure is related to a touch control method, particularly related to a touch control method integrating a fingerprint recognition mode and a touch operation mode.

Description of Related Art

The touch function is fundamental function for most of the smart electronic devices, and with the increasing development of electronic business, introducing biological recognition technology is a necessary requirement. Particularly, the fingerprint recognition is the primary selection. Specifically, regarding the popularity of the frameless full screen touch device nowadays, how to integrate the fingerprint recognition function to the display screen becomes the important issue.

In the related art, the main stream of the in-display fingerprint technology is ultrasonic type and optical type. However, the primary disadvantages of that are high cost and manufacturing difficulty such as alignment difficulty or optical path problem. Moreover, the sensing area of the fingerprint recognition device is small and restricted to specific spot, that may decrease the convenience for usage. Further, the cost of the electronic product may be increased because the fingerprint recognition device needs to be installed additionally. Laptop may also have the need of integrating touch function and fingerprint recognition function. However, when the two functions are integrated, how to improve the using experience and automatically and effectively recognize whether the user performs touch operation or identity confirmation becomes the important issue.

In view of this, the inventors have devoted themselves to the aforementioned related art, researched intensively try to solve the aforementioned problems.

SUMMARY OF THE DISCLOSURE

The object of the disclosure is to provide a touch control method integrating the touch operation mode and the fingerprint recognition mode in the same touch device.

In order to achieve the object, the disclosure provides a touch control method configured to control a touch control mode and a fingerprint recognition mode. The method includes: providing a touch device, wherein the touch device includes a plurality of touch electrodes, and each touch electrode comprises a plurality of sensing electrodes; determining whether an object is located in a sensing distance of the touch electrodes; if result of the determining is yes, detecting a sensing group of the touch electrodes sensing the object; determining whether an electrode amount in the sensing group is greater than or equal to a first value and less than or equal to a second value; determining whether a sensing time of a predetermined proportion of the touch electrodes in the sensing group is greater than or equal to a predetermined time; if the electrode amount is greater than or equal to the first value and less than or equal to the second value, and if the sensing time is greater than or equal to the predetermined time, executing the fingerprint recognition mode; and if the electrode amount is less than the first value and greater than the second value, or if the sensing time is less than the predetermined time, executing the touch operation mode.

In order to achieve the object, the disclosure provides a touch control method configured to control a touch control mode and a fingerprint recognition mode. The method includes: providing a touch device, wherein the touch device includes a plurality of sensing electrodes; determining whether an object is located in a sensing distance of the sensing electrodes; if result of the determining is yes, detecting a sensing group of the sensing electrodes sensing the object; determining whether a sensing time of a predetermined proportion of the sensing electrodes in the sensing group is greater than or equal to a predetermined time; if the sensing time is greater than or equal to the predetermined time, executing the fingerprint recognition mode; and if the sensing time is less than the predetermined time, executing the touch operation mode.

In order to achieve the object, the disclosure provides a touch control method configured to control a touch control mode and a fingerprint recognition mode. The method includes: providing a touch device, wherein the touch device includes a plurality of sensing electrodes; determining whether an object is located in a sensing distance of the sensing electrodes; if result of the determining is yes, detecting a sensing group of the sensing electrodes sensing the object; determining whether a sensing area of the sensing group is greater than or equal to a first area and less than or equal to a second area; determining whether a sensing time of a predetermined proportion of the sensing electrodes in the sensing group is greater than or equal to a predetermined time; if the sensing area is greater than or equal to the first area and less than or equal to the second area, and if the sensing time is greater than or equal to the predetermined time, executing the fingerprint recognition mode; and if the sensing area is less than the first area or greater than the second area, or if the sensing time is less than the predetermined time, executing the touch operation mode.

In the touch control method of the disclosure, by determining whether the electrode amount of the touch electrodes or the sensing electrodes is between two predetermined threshold values and determining the sensing time of the predetermined proportion of the touch electrodes or the sensing electrodes is greater than or equal to the predetermined time, the fingerprint recognition mode and the touch operation mode may be respectively executed on the same touch device. Therefore, the fingerprint recognition device and the touch device do not need to be installed separately. The manufacturing cost of the electronic product may be decreased and the problem of limitation to the installing location of the fingerprint recognition device may be prevented.

DETAILED DESCRIPTION

Figure 1:
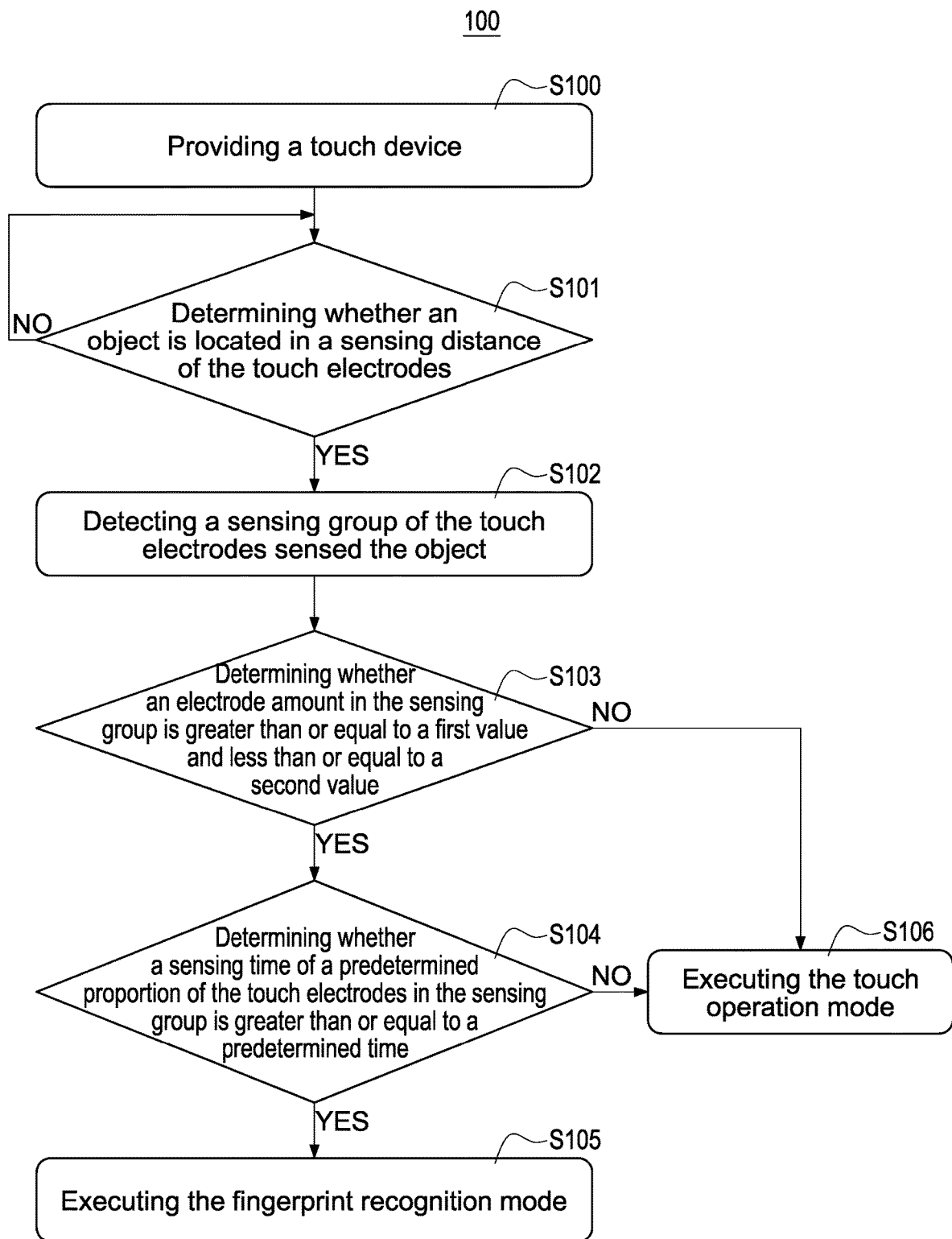
FIG. 1 is the flowchart of a touch control method, in accordance with the first embodiment of the disclosure.

The technical contents of this disclosure will become apparent with the detailed description of embodiments accompanied with the illustration of related drawings as follows. It is intended that the embodiments and drawings disclosed herein are to be considered illustrative rather than restrictive.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

FIG. 1 is the flowchart of a touch control method, in accordance with the first embodiment of the disclosure. Referring to FIG. 1, the touch control method 100 of the first embodiment in the disclosure is used for controlling a touch operation mode and a fingerprint recognition mode. The touch control method includes the step S100 to the step S106. The step S100 is providing a touch device. The touch device includes a plurality of touch electrodes, and each touch electrode comprises a plurality of sensing electrodes. The step S101 is determining whether an object is located in a sensing distance of the touch electrodes. The step S102 is that if result of the determining is yes, detecting a sensing group of the touch electrodes sensing the object. The step S103 is determining whether an electrode amount in the sensing group is greater than or equal to a first value and less than or equal to a second value. The step S104 is determining whether a sensing time of a predetermined proportion of the touch electrodes in the sensing group is greater than or equal to a predetermined time. The step S105 is that if the electrode amount is greater than or equal to the first value and less than or equal to the second value, and if the sensing time is greater than or equal to the predetermined time, executing the fingerprint recognition mode. The step S106 is that if the electrode amount is less than the first value or greater than the second value, or if the sensing time is less than the predetermined time, executing the touch operation mode.

Figure 3:
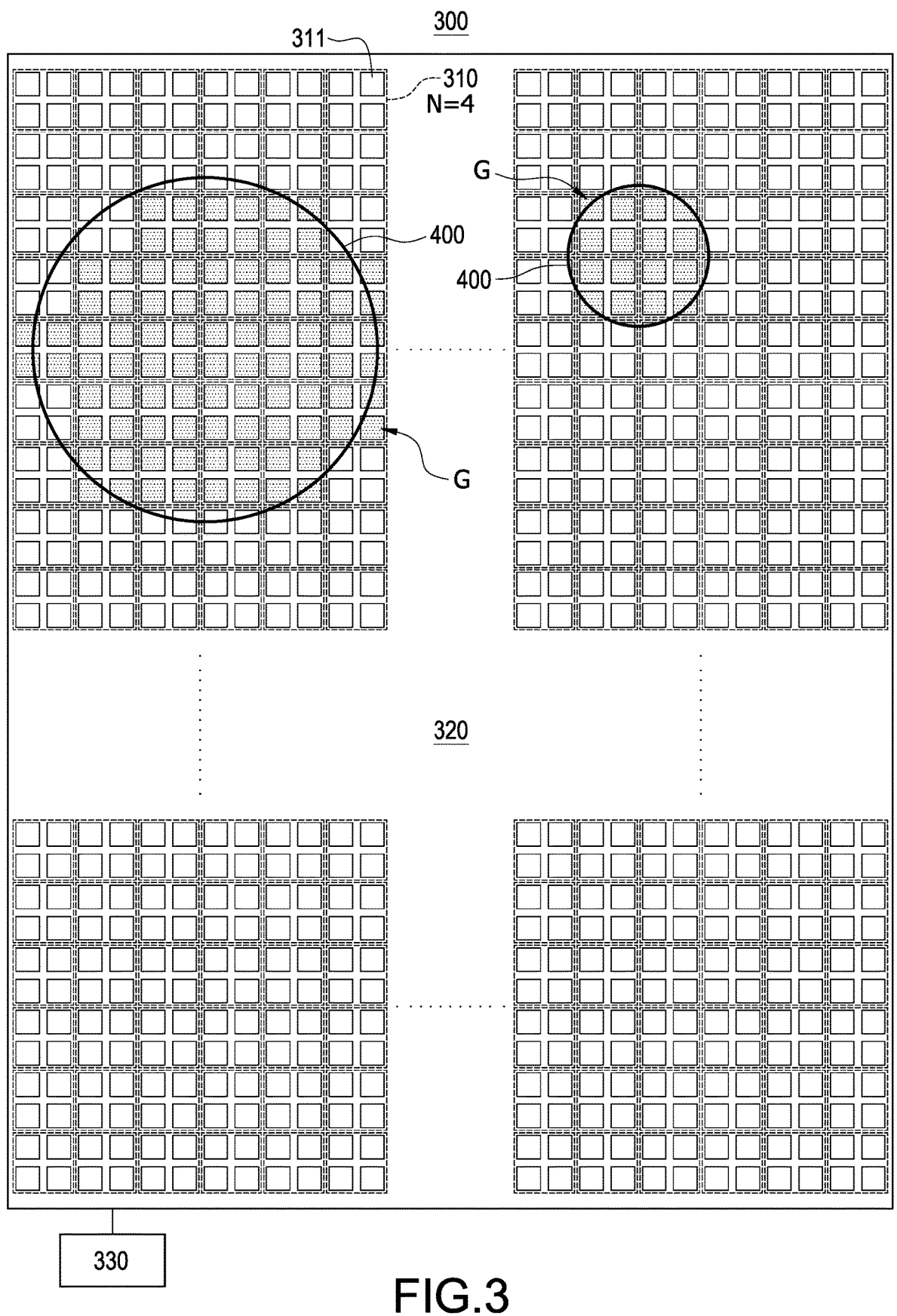
FIG. 3 is the schematic diagram of the touch device in the touch control method of the disclosure.

FIG. 3 is the schematic diagram of the touch device in the touch control method of the disclosure. Referring to FIG. 3 and the step S100 in FIG. 1, the touch device 300 may be installed in an electronic product (not shown in figures). In some embodiments, the touch device 300 may include a plurality of touch electrodes 310, a substrate 320, and a control circuit 330 (for example, fingerprint and touch control integrated circuit). Each touch electrode 310 may include multiple sensing electrodes 311 disposed on the substrate 320. It should be noted that the amount of the sensing electrodes 311 in each touch electrode 310 is not limiting, and here uses, but not limited to, four sensing electrodes 311 in one touch electrode 310 as an example. Further, the area of the sensing electrode 311 may be, but not limited to, substantially less than or equal to 40000 μm$^2$ (or 200 μm×200 μm). The control circuit 330 is used to control and drive the touch electrodes 310 and the sensing electrodes 311.

In some embodiments, the touch device 300 may further include multiple switch circuit groups, multiple data lines, multiple control lines, etc., here is not intended to be limiting. For clearly specifying the disclosure, the aforementioned circuit elements are not shown in figures. In some embodiments, the touch device 300 may further include a display screen (not shown in figures), and the sensing electrodes 311 may be located on a display region of the display screen. It is worth mentioning that the total area formed by the sensing electrodes 311 may be substantially equal to or less than the area of the display region. Further, the sensing electrodes 311 in the disclosure are physically formed electrode, for example, the electrode formed by the conductive material. On the other hand, the touch electrodes 310 are the logic electrode collectively formed by connecting multiple sensing electrodes 311 with multiplexer and connection lines. Therefore, the control circuit 330 may determine and respectively control the sensing electrodes 311 or touch electrodes 310. The precision for fingerprint sensing may be provided because the area of the sensing electrode 311 is smaller comparing to that of the touch electrode 310. On the other hand, rapid touch detection may be provided by logically organizing the sensing electrodes 311 to assemble the touch electrodes 310 to make the touch device 300 execute the corresponding touch function.

Referring to FIG. 3 and the step S101 in FIG. 1, the touch device 300 (or the control circuit 330 thereof) may be configured to determine whether the object 400 is located in the sensing distance of the touch electrodes 310. In some embodiments, the object 400 may be, but not limited to, the user's finger or the auxiliary instrument for touch function (such as touch stylus). It should be noted that the conditions of the object 400 being located in the sensing distance of the touch electrodes 310 include the condition of the object 400 directly contacting the touch device 300, and the condition of the object 400 and the touch device 300 being separated in a distance where the touch electrodes 310 may sense the object 400 (that is, proximity sensing). Further, the touch device 300 may be configured to sequentially or randomly detect the touch electrodes 310 (or the sensing electrodes 311) to determine whether any object 400 approaches. If result of the determination is yes, the step S102 is executed. If result of the determination is no, the step S101 is re-executed. In other words, if result of the determination is no, the touch device 300 may be configured to keep detecting the touch electrodes 310 and to determine whether any object 400 is located in the sensing distance of the touch electrodes 310 (or the sensing electrodes 311).

Referring to FIG. 3 and the step S102 in FIG. 1, if result of the determination is yes, the touch device 300 may detect the sensing group G of the touch electrodes 310 sensing the object 400. The sensing group G has multiple touch electrodes 310 sensing the object 400. It should be noted that the sensing group G indicates a single sensing range formed by adjacent touch electrodes 310. In other words, the sensing group G includes the touch electrodes 310 in the single sensing range sensed the single object 400.

Referring to FIG. 3 and the step S103 in FIG. 1, the electrode amount N in the sensing group G is determined. The electrode amount N indicates the amount of the touch electrodes 310 in the sensing group G. That is, the amount of the touch electrodes 310 sensing the object 400. If the electrode amount N is greater than or equal to the first value $N_{min}$ and less than or equal to the second value $N_{max}$, that is, $N_{min} \leq N \leq N_{max}$, the step S104 is executed. If the electrode amount N is less than the first value $N_{min}$ or greater than the second value $N_{max}$, that is, $N_{max} < N$ or $N < N_{min}$, the step S106 is executed. In some embodiments, the first value is less than or equal to 5 and the second value is greater than or equal to 50, here is not intended to be limiting.

Further, referring back to FIG. 3, in some embodiments, the touch device 300 may be configured to measure the sensing capacitance value of any one touch electrode 310 to determine whether the touch electrode 310 belongs to the sensing group G. For example, even a part of the touch electrode 310 is located in the range of the sensing group G, the touch electrode 310 is still not being counted as the electrode amount N if the sensing capacitance value is not greater than a threshold value. Similarly, even a part of the touch electrode 310 is not located in the range of the sensing group G, the touch electrode 310 is still being counted as the electrode amount N if the sensing capacitance value is greater than the threshold value.

Referring to FIG. 3 and the step S104 in FIG. 1, whether the sensing time T of the predetermined proportion of the touch electrodes 310 in the sensing group G is greater than or equal to the predetermined time $T_{th}$ is determined. In some embodiments, the predetermined proportion may be, for example, greater than or equal to 70%. In other words, the sensing time T of greater than or equal to 70% of the electrode amount N in the sensing group G is being compared to the predetermined time $T_{th}$, here is not intended to be limiting. Depending on the requirement, the predetermined proportion may be configured as greater than or equal to 75%, greater than or equal to 80%, greater than or equal to 85%, or greater than or equal to the other proportions. The sensing time T indicates the time that the touch electrodes 310 continuously sense the object 400. The predetermined time $T_{th}$ is, but not limited to, greater than or equal to 100 msec. If the sensing time T is greater than or equal to the predetermined time $T_{th}$, that is, $T_{th} \leq T$, the step S105 is executed. If the sensing time T is less than the predetermined time $T_{th}$, that is, $T < T_{th}$, the step S106 is executed.

Referring to FIG. 3 and the step S105 in FIG. 1, if the electrode amount N is greater than or equal to the first value $N_{min}$ and less than or equal to the second value $N_{max}$, and if the sensing time T is greater than or equal to the predetermined time $T_{th}$, the fingerprint recognition mode is executed.

Figure 2A:
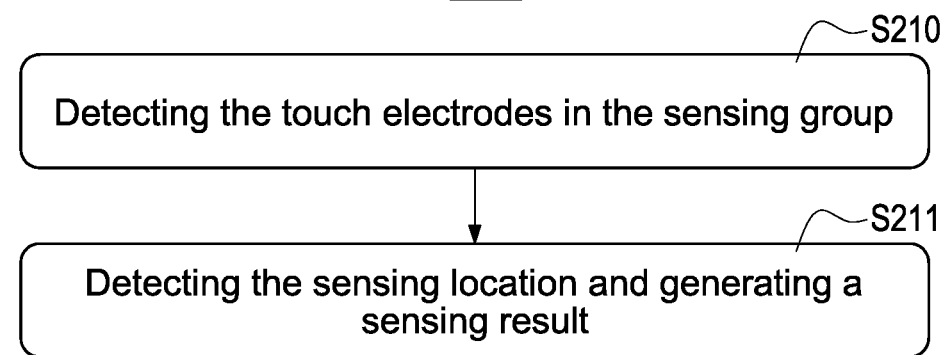
FIG. 2A is the flowchart of a touch operation mode in the touch control method of the disclosure.
Figure 2B:
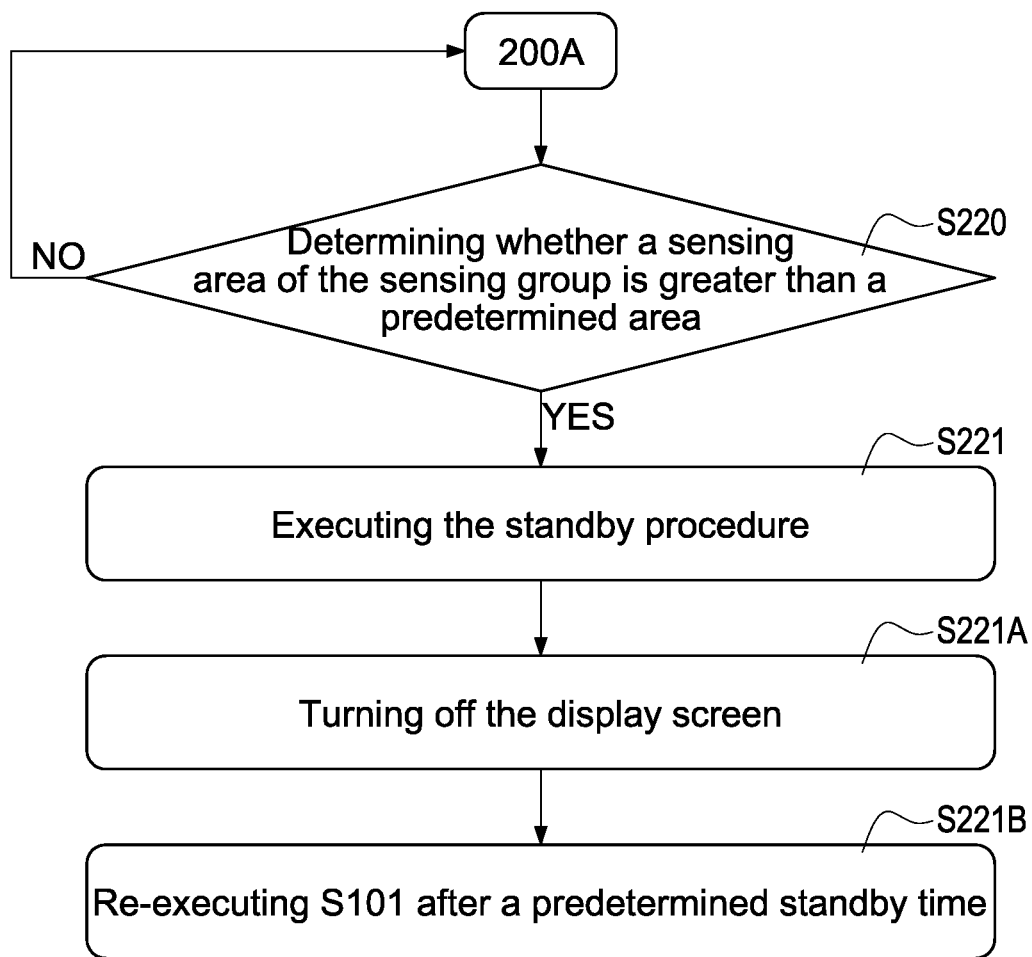
FIG. 2B is the flowchart of a standby mode in the touch control method of the disclosure.
Figure 2C:
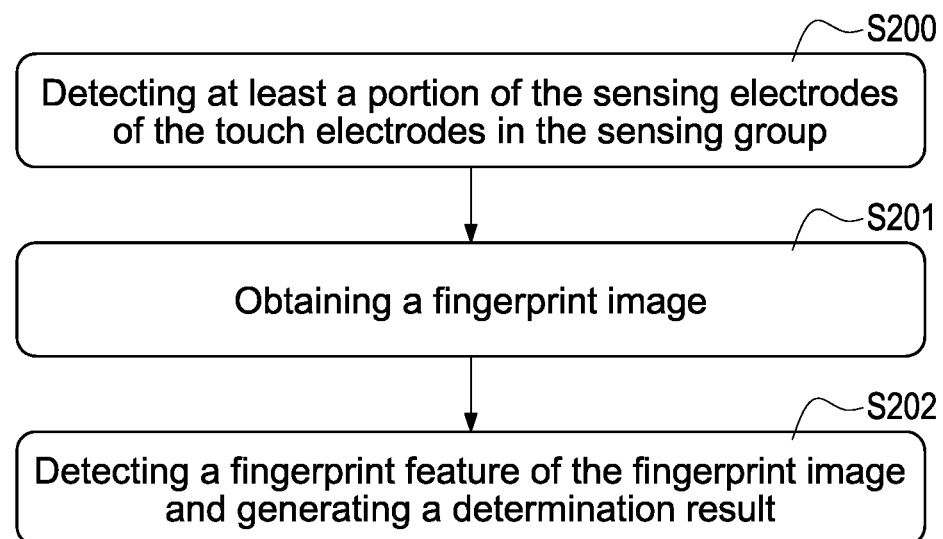
FIG. 2C is the flowchart of a fingerprint recognition mode in the touch control method of the disclosure.

FIG. 2C is the flowchart of a fingerprint recognition mode in the touch control method of the disclosure. Referring to FIG. 2C, the fingerprint recognition mode 200C may include the step S200 to the step S202. Referring to FIG. 3 and the step S200 and the step S201 in FIG. 2C, the step S200 is detecting at least a portion of the sensing electrodes 311 of the touch electrodes 310 in the sensing group G, and the step S201 is obtaining a fingerprint image. In some embodiments, when the fingerprint recognition mode 200C is executed, the touch device 300 may be configured to detect at least a portion of the sensing electrodes 311 in the sensing group G sensing the object 400 to obtain the fingerprint image (not shown in figures) through the sensing electrodes 311. In other words, a portion of the sensing electrodes 311 in the sensing group G is used as the target electrodes, each sensing electrode 311 obtains part of the image data of the fingerprint image, and the touch device 300 is configured to construct the complete fingerprint image through detecting the image data obtained by the sensing electrodes 311.

Referring to FIG. 3 and the step S202 in FIG. 2C, the step S202 is detecting a fingerprint feature of the fingerprint image and generating a determination result. In some embodiments, the touch device 300 may be configured to detect the fingerprint image, obtain the fingerprint feature, and perform analysis to the fingerprint feature. For example, the fingerprint feature may be compared with the fingerprint data in the database, whether the fingerprint feature is conformed with any fingerprint data in the database may be determined, and the determination result is generated.

In some embodiments, the fingerprint recognition mode 200C may further include the step of executing a fingerprint authentication action according to the determination result. That is, if the determination result is that the fingerprint image is conformed with the fingerprint data in the database, the touch device 300 may execute the fingerprint authentication action. The fingerprint authentication action includes an unlock action, an authentication action, and an open action, here is not intended to be limiting. On the other hand, if the determination result is that the fingerprint image is not conformed with the fingerprint data in the database, the touch device 300 does not execute the fingerprint authentication action.

The unlock action may be, for example, to unlock the electronic product having the touch device 300 (as shown in FIG. 3). When the electronic product is unlocked, the user may operate the electronic product.

The authentication action, for example, may include an identity authentication action, a file encryption/decryption action, and an online payment action. The identity authentication action, for example, is executing the user authenticating action when the user executes specific application or website. The file encryption/decryption action, for example, is executing the encrypting or decrypting action to specific file when the user executes specific file. The online payment action, for example, is executing the paying action when the user executes specific application or website to purchase items.

The open action includes a file open authorization action and an application open authorization action. The file open authorization action, for example, is executing the authorizing action for opening the encrypted file when the user intends to execute specific encrypted file. The application open authorization action, for example, is executing the authorizing action for opening the encrypted application when the user intends to execute specific encrypted application.

Referring to FIG. 3 and the step S106 in FIG. 1, if the electrode amount N is less than the first value $N_{min}$ or greater than the second value $N_{max}$, or if the sensing time T is less than the predetermined time $T_{th}$, the touch operation mode 200A is executed. FIG. 2A is the flowchart of a touch operation mode in the touch control method of the disclosure. The touch operation mode 200A may include the step S210 and the step S211. Referring to FIG. 3 and the step S210 in FIG. 2A, the step S210 is detecting the touch electrodes 310 in the sensing group G. In some embodiments, when the touch device 300 is configured to execute the touch operation mode 200A, the touch device 300 may detect the touch electrodes 310 in the sensing group G sensing the object 400 to obtain a sensing location (for example, the location of the sensing group G in FIG. 3) through the touch electrodes 310.

Referring to FIG. 3 and the step S211 in FIG. 2A, the step S211 is detecting the sensing location and generating a sensing result. The sensing result, for example, may include a clicking action, a sliding action, and the other useful touch operation actions. The touch device 300 may be configured to correspondingly display the image on the display region of the display screen according to the sensing result. For example, the image on the display region may display the open action for the application corresponding to the clicking action from the user. For another example, the image on the display region may display the sliding action for pages corresponding to the sliding action from the user.

In summary, in the touch control method of the disclosure, by determining whether the electrode amount N of the touch electrodes 310 sensing the object 400 is between two predetermined threshold values $N_{min}$, $N_{max}$ and determining whether the sensing time T of the predetermined proportion of the touch electrodes 310 is greater than or equal to the predetermined time $T_{th}$, the fingerprint recognition mode 200C and the touch operation mode 200A may be respectively executed on the same touch device 300. In other words, the fingerprint recognition device and the touch device do not need to be installed separately, the manufacturing cost of the electronic product may be decreased. Further, the installing location of the fingerprint recognition device does not need to be restricted on corner or specified location. Thus, the full-screen fingerprint recognition may be provided to increase the convenience of the electronic product.

In some embodiments, the touch control method of the disclosure may further include a standby mode. FIG. 2B is the flowchart of a standby mode in the touch control method of the disclosure. The standby mode 200B may include the step S220 and the step S221. Referring to FIG. 3 and the step S220 in FIG. 2B, the step S220 is determining whether a sensing area A of the sensing group G is greater than a predetermined area $A_{th}$ when the touch operation mode is executed 200A. The touch electrodes 310 in the sensing group G may form the sensing area A. The sensing area A indicates the occupied area of the sensing electrodes 311 sensing the object 400. In some embodiments, the predetermined area $A_{th}$ may be, but not limited to, greater than or equal to ⅘ or ⅔ of a total area of the display region. In some other embodiments, the predetermined area $A_{th}$ may be, but not limited to, greater than or equal to 5 cm². If result of the determining is yes, the step S221 is executed. If result of the determining is no, the touch operation mode in FIG. 2A is executed.

Referring to FIG. 3 and the step S221 in FIG. 2B, the step S221 is executing the standby procedure. In some embodiments, the standby procedure may include the step S221A and the step S221B. The step S221A is turning off the display screen. The step S221B is re-executing the determining of whether the object 400 is located in the sensing distance of the touch electrodes 310 (that is, re-executing the step S101) after a predetermined standby time. In some embodiments, in the predetermined standby time, the touch device 300 does not perform the sensing operation. Moreover, the duration of the predetermined standby time may be the manually configured value from the user or the systematic predetermined value, here is not intended to be limiting.

Therefore, when the touch operation mode is executed, the user may make the touch device 300 to execute the standby mode through contacting most of the touch electrodes 310 of the touch device 300. As a result, the convenience of using the touch device 300 may be increased. Further, if the user forgets to turn off the touch device 300 and the touch device 300 is erroneously contacted by another object, the erroneous operation may be prevented through making the touch device 300 automatically execute the standby mode.

Figure 4:
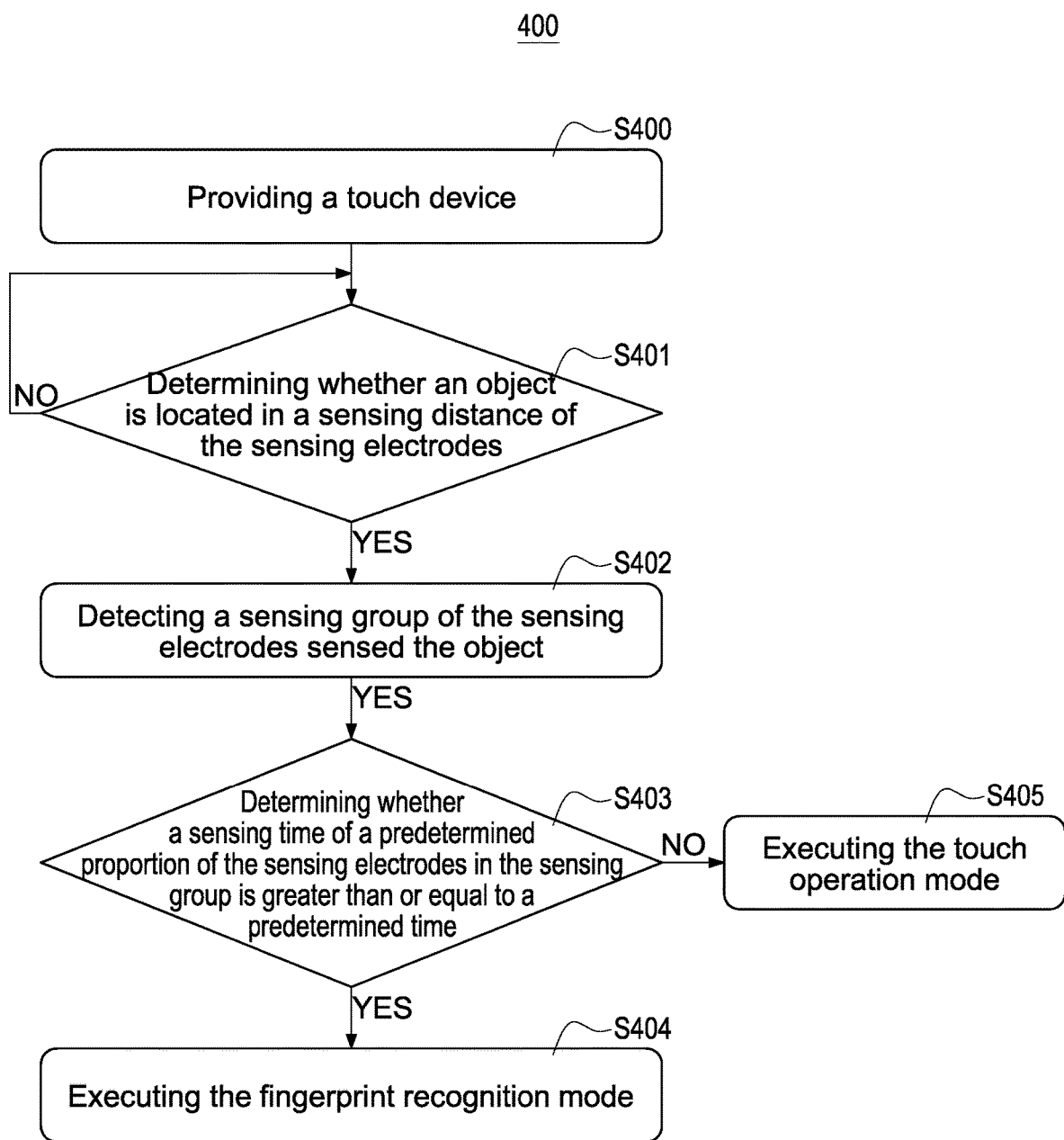
FIG. 4 is the flowchart of a touch control method, in accordance with the second embodiment of the disclosure.

FIG. 4 is the flowchart of a touch control method, in accordance with the second embodiment of the disclosure. Referring to FIG. 4, the touch control method 400 of the second embodiment in the disclosure is used for controlling a touch operation mode and a fingerprint recognition mode. The touch control method includes the step S400 to the step S405. The step S400 is providing a touch device. The touch device includes a plurality of sensing electrodes. The step S401 is determining whether an object is located in a sensing distance of the sensing electrodes. The step S402 is that if result of the determining is yes, detecting a sensing group of the sensing electrodes sensing the object. The step S403 is determining whether a sensing time of a predetermined proportion of the sensing electrodes in the sensing group is greater than or equal to a predetermined time. The step S404 is that if the sensing time is greater than or equal to the predetermined time, executing the fingerprint recognition mode. The step S405 is that if the sensing time is less than the predetermined time, executing the touch operation mode.

The difference between the touch control method 400 of the second embodiment and the touch control method 100 of the first embodiment is that the touch device is configured to directly detect the sensing electrodes sensing the object in all of the sensing electrodes for the sensing group, and when the sensing time of the predetermined proportion of the sensing electrodes in the sensing group is greater than or equal to the predetermined time, the touch may be configured to execute the fingerprint recognition mode. In other words, when the user contacts the touch device for the time greater than or equal to the predetermined time, the touch device may execute the fingerprint recognition mode.

Therefore, when the user intends to execute the fingerprint recognition mode but cannot contact the electrodes of predetermined amount with various possible reasons, the user is still able to execute the fingerprint recognition mode by contacting the touch device for the time greater than or equal to the predetermined time. As a result, the convenience of using the touch device may be increased. It is worth mentioning that the touch control method 400 of the second embodiment may also be adopted in the touch device 300 as shown in FIG. 3. Further, the control methods of the fingerprint recognition mode and the touch operation mode are described in FIG. 2A to FIG. 2C, here is omitted for brevity.

Figure 5:
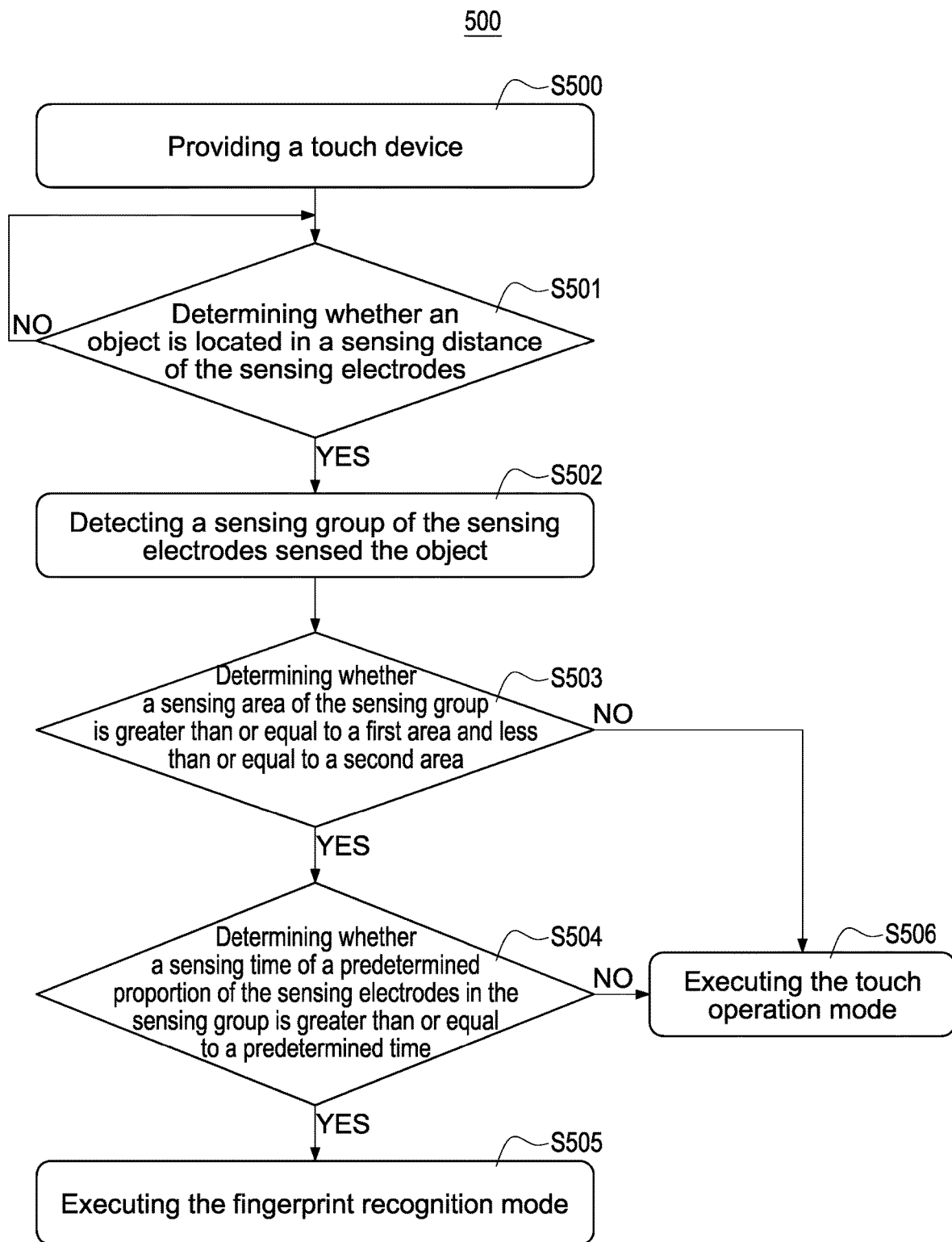
FIG. 5 is the flowchart of a touch control method, in accordance with the third embodiment of the disclosure.

FIG. 5 is the flowchart of a touch control method, in accordance with the third embodiment of the disclosure. Referring to FIG. 5, the touch control method 500 of the third embodiment in the disclosure is used for controlling a touch operation mode and a fingerprint recognition mode. The touch control method includes the step S500 to the step S506. The step S500 is providing a touch device. The touch device includes a plurality of sensing electrodes. The step S501 is determining whether an object is located in a sensing distance of the sensing electrodes. The step S502 is that if result of the determining is yes, detecting a sensing group of the sensing electrodes sensing the object. The step S503 is determining whether a sensing area of the sensing group is greater than or equal to a first area and less than or equal to a second area. The step S504 is determining whether a sensing time of a predetermined proportion of the sensing electrodes in the sensing group is greater than or equal to a predetermined time. The step S505 is that if the sensing area is greater than or equal to the first area and less than or equal to the second area, and if the sensing time is greater than or equal to the predetermined time, executing the fingerprint recognition mode. The step S506 is that if the sensing area is less than the first area or greater than the second area, or if the sensing time is less than the predetermined time, executing the touch operation mode.

The difference between the touch control method 500 of the third embodiment and the touch control method 100 of the first embodiment is that the touch device is configured to directly detect the sensing electrodes sensing the object in all of the sensing electrodes for the sensing group, and determine whether to execute the fingerprint recognition mode or the touch operation mode by the sensing area of the sensing group. In other words, when the user contacts the touch device with the sensing area greater than or equal to the first area and less than or equal to the second area, and the user contacts the touch device for the time greater than or equal to the predetermined time, the touch device may execute the fingerprint recognition mode. The first area may be, but not limited to, the area formed by less than or equal to twenty sensing electrodes. The second area may be, but not limited to, the area formed by more than or equal to two hundred sensing electrodes. It should be noted that the sensing area of the sensing group indicates the area of the single sensing range formed by adjacent sensing electrodes. That is, the sensing area formed by the sensing electrodes in the single sensing range with respect to the single object being sensed.

Therefore, whether executing the fingerprint mode or the touch control mode may be determined through the sensing area formed by the sensing electrodes of the touch device, and the control differentiability of the touch device may be increased. It is worth mentioning that the touch control method 500 of the third embodiment may also be adopted in the touch device 300 as shown in FIG. 3. Further, the control methods of the fingerprint recognition mode and the touch operation mode are described in FIG. 2A to FIG. 2C, here is omitted for brevity.

As used herein, the term "substantially" or "about" refers to a range of measurements of a length, thickness, a quantity, time period, or other measurable value. Such range of measurements encompasses variations of less than or equal to ±10%, less than or equal to ±5%, less than or equal to ±4%, less than or equal to ±3%, less than or equal to ±2%, less than or equal to ±1%, less than or equal to ±0.5%, less than or equal to ±0.1%, less than or equal to ±0.05% from the specified value, in so far as such variations are appropriate in order to function in the disclosed devices, systems, and techniques.

While this disclosure has been described by means of specific embodiments, numerous modifications and variations may be made thereto by those skilled in the art without departing from the scope and spirit of this disclosure set forth in the claims.

What is claimed is:

1. A touch control method, configured to control a touch operation mode and a fingerprint recognition mode, the method comprising:
   providing a touch device, wherein the touch device comprises a plurality of sensing electrodes;
   determining whether an object is located in a sensing distance of the sensing electrodes;
   when result of the determining is yes, detecting a sensing group of the sensing electrodes sensing the object;
   determining whether a sensing area of the sensing group is greater than or equal to a first area and less than or equal to a second area;
   determining whether a sensing time of a predetermined proportion of the sensing electrodes in the sensing group is greater than or equal to a predetermined time;
   if the sensing area is greater than or equal to the first area and less than or equal to the second area, and if the sensing time is greater than or equal to the predetermined time, executing the fingerprint recognition mode; and
   if the sensing area is less than the first area or greater than the second area, or if the sensing time is less than the predetermined time, executing the touch operation mode.

2. The touch control method according to claim 1, wherein the fingerprint recognition mode comprising:
   detecting at least a portion of the sensing electrodes of the touch electrodes in the sensing group;
   obtaining a fingerprint image; and
   detecting a fingerprint feature of the fingerprint image and generating a determination result.

3. The touch control method according to claim 2, further comprising:
   executing a fingerprint authentication action according to the determination result, wherein the fingerprint authentication action comprises an unlock action, an authentication action, and an open action.

4. The touch control method according to claim 3, wherein the authentication action comprises an identity authentication action, a file encryption/decryption action, and an online payment action.

5. The touch control method according to claim 3, wherein the open action comprises a file open authorization action and an application open authorization action.

6. The touch control method according to claim 1, wherein an area of each sensing electrode is less than or equal to 40000 μm2.

7. The touch control method according to claim 1, wherein the touch device further comprises a display screen, the sensing electrodes are located on a display region of the display screen.

8. The touch control method according to claim 7, further comprising:
   determining whether a sensing area of the sensing group is greater than a predetermined area when the touch operation mode is executed; and
   when result of the determining is yes, executing a standby procedure.

9. The touch control method according to claim 8, wherein the predetermined area is greater than or equal to ⅘ or ⅔ of a total area of the display region.

10. The touch control method according to claim 8, wherein the standby procedure comprises:
   turning off the display screen; and
   after a predetermined standby time, re-executing the determining of whether the object is located in the sensing distance of the touch electrodes.

* * * * *